United States Patent
Leccese et al.

(10) Patent No.: US 12,013,502 B2
(45) Date of Patent: Jun. 18, 2024

(54) HIGH-RESOLUTION SCINTILLATION DETECTOR FOR TWO-DIMENSIONAL RECONSTRUCTION

(71) Applicant: ECOLE POLYTECHNIQUE FEDERALE DE LAUSANNE (EPFL), Lausanne (CH)

(72) Inventors: Veronica Leccese, Morges (CH);
Michele Caldara, Geneva (CH);
Arnaud Bertsch, Chavannes-près-Renens (CH);
Alessandro Mapelli, Radazul (ES);
Fabrizio Carbone, Crans-près-Céligny (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 17/846,089

(22) Filed: Jun. 22, 2022

(65) Prior Publication Data
US 2023/0417935 A1 Dec. 28, 2023

(51) Int. Cl.
*G01T 1/20* (2006.01)
*G01T 1/203* (2006.01)

(52) U.S. Cl.
CPC ........ *G01T 1/20187* (2020.05); *G01T 1/2033* (2013.01)

(58) Field of Classification Search
CPC ............ G01T 1/20187; G01T 1/2033
See application file for complete search history.

(56) References Cited

U.S. PATENT DOCUMENTS

| | | | |
|---|---|---|---|
| 4,942,302 A | 7/1990 | Koechner | |
| 6,534,772 B1* | 3/2003 | Chhabra | G01T 1/2921 977/890 |
| 6,892,010 B2 | 5/2005 | Miao et al. | |
| 7,652,261 B1* | 1/2010 | Wilson | G01T 1/16 250/370.11 |
| 8,026,489 B2 | 9/2011 | Haguenauer et al. | |
| 9,219,093 B1* | 12/2015 | Vora | H01L 27/14636 |
| 9,316,748 B2 | 4/2016 | Mapelli et al. | |

(Continued)

FOREIGN PATENT DOCUMENTS

| | | |
|---|---|---|
| WO | WO 2007093735 | 8/2007 |
| WO | WO 2013167151 | 11/2013 |

OTHER PUBLICATIONS

Mapelli et al. ("Development and Studies of Novel Microfabricated Radiation Hard Scintillation Detectors With High Spatial Resolution", IEEE Transactions on Nuclear Science, vol. 58, No. 3, Jun. 2011, pp. 1177-1180) (Year: 2011).*

(Continued)

*Primary Examiner* — Hugh Maupin
(74) *Attorney, Agent, or Firm* — Nixon & Vanderhye P.C.

(57) ABSTRACT

A scintillation device including a silicon plate having a rectangular shape and having a first side and a second side opposite the first side, wherein the first side includes a plurality of first channels arranged to be in parallel with each other extending in a first direction, wherein walls in the silicon plate that form the first channels are coated with an optically reflective or dielectric layer, and wherein the first channels are filled with a scintillation resin in a solid state forming a first waveguide.

19 Claims, 11 Drawing Sheets

(56) References Cited

U.S. PATENT DOCUMENTS

| | | | |
|---|---|---|---|
| 2002/0074929 A1* | 6/2002 | Taskar | G01T 1/20 |
| | | | 313/467 |
| 2010/0065747 A1 | 3/2010 | Haguenauer et al. | |
| 2013/0260558 A1* | 10/2013 | Oota | B24B 37/044 |
| | | | 438/693 |
| 2015/0105603 A1 | 4/2015 | Mapelli et al. | |
| 2021/0364660 A1 | 11/2021 | Pittet et al. | |

OTHER PUBLICATIONS

U.S. Appl. No. 17/846,136, Leccese et al.

Gruber, L., & LHCb SciFi Tracker Collaboration. (2020). LHCb SciFi-Upgrading LHCb with a scintillating fibre tracker. Nuclear Instruments and Methods in Physics Research Section A: Accelerators, Spectrometers, Detectors and Associated Equipment, 958, 162025.

L. Muller, 'Development and characterization of photo-polymeric scintillating microfluidic waveguides', MSC Thesis, E'cole Polytechnique Fe'de'rale de Lausanne, Lausanne (2016).

Leccese, V., Pagano, M., Carbone, F., Caldara, M., & Mapelli, A. (2021) Recent advances in MicroScint beam profiler technology. Poster presentation, SPS Meeting, Innsbruck (AUS).

Leccese, V., Pagano, M., Carbone, F., Caldara, M., & Mapelli, A. Recent advances in MicroScint beam profiler technology (2021) Poster presentation, PSD12, Birmingham (UK).

M. Pagano, 'Development of a high-resolution and high-frame rate beam profiler for medical accelerators', MSc Thesis, Politecnico di Torino, Italy, E'cole Polytechnique Fe'de'rale de Lausanne, Lausanne (2021).

Maoddi, P. (2015). Microfluidic scintillation detectors for high energy physics (No. 6620 Thesis). EPFL. pp. 23-32.

Mapelli, A. (2011). Scintillation Particle Detectors Based on Plastic Optical Fibres and Microfluidics (Doctoral dissertation, Ecole Polytechnique, Lausanne). p. 98.

Ozkan Loch, C., Eichenberger, M. A., Togno, M., Zinsli, S. P., Egloff, M., Papa, A., . . . & Safai, S. (2020). Characterization of a low-cost plastic fiber array detector for proton beam dosimetry. Sensors, 20(20), 5727.

Rojatti, E., Calvi, G., Lanzavecchia, L., Parravicini, A. , & Viviani, C. (2016). Study of the radiation damage on a scintillating fibers based beam profile monitor, TUPG68 Proceedings of IBIC2016, Barcelona, Spain.

Zimmermann, C. J., Ryde, N., Kallay, N. , Partch, R. E. , & Matijević, E. (1991). Plasma modification of polyvinyltoluene and polystyrene latices. Journal of materials research, 6(4), 855-860.

European Search Report for Application No. EP 23 17 8334, three pages, dated Nov. 1, 2023.

* cited by examiner

HIGH-RESOLUTION SCINTILLATION DETECTOR FOR TWO-DIMENSIONAL RECONSTRUCTION

CROSS-REFEDENCE TO RELATED APPLICATIONS

The present patent application is related to the concurrently filed U.S. patent application Ser. No. 17/846,136, filed on Jun. 22, 2022, the entire contents thereof herewith incorporated by reference in its entirety.

FIELD OF THE INVENTION

The present invention is directed to the field of scintillation detectors, methods of manufacturing scintillation detectors, for example for use of different types of radiation-based medical imaging.

BACKGROUND

In the field of scintillator devices and plates for medical applications to detect ionizing radiation, for example for the use with X-ray imaging, gamma ray imaging, isotopic imaging such as positron emission tomography (PET), Single Photon Emission Computed Tomography (SPECT), computer tomography (CT) scanners, linear accelerators (LINAC), cyclotrons, synchrotrons, and other applications, different types of scintillator structures have been proposed, for conversion of the incoming radiation into photons for imaging and other detection purposes. However, scintillation structures, for example particle beam profilers that use optical scintillating fibers, suffer from radiation damage after only few years of use. For this reason, the use of liquid scintillation material has been proposed, as the liquid scintillator material is that it can be readily replaced, however, the manufacture turns out to be quite demanding.

For example, in U.S. Pat. No. 9,316,748, this reference herewith incorporated by reference in its entirety, a scintillation detector is described that uses a liquid scintillation material arranged in channels that are in fluid communication with each other. In addition, when manufacturing scintillator devices using scintillation liquid, the capillarity of the channels during the filling stage is problematic. These capillarity effects are in general governed by the interplay between surface tension of a liquid and the geometry and surface chemistry of a cavity that can serve as a solid support. The filling stage of the microchannels depends on different factors, including the geometry and the material of the microchannels, the flow velocity/pressure, the contact angle of channel surface and the liquid surface tension. Small variations of these parameters or impurities due to the fabrication process can result in a different filling time, dead zone formation and air bubble trapping. For these reasons, it is very difficult and costly to make channels or other structures that are very small, thereby strongly limiting the resolution of the scintillation detector. In addition, the scintillation detectors that use liquid scintillation material are strongly limited in their application field and use, as they cannot be used inside a vacuumized environment, for example for cyclotrons, synchrotrons, or medical linear accelerators (LINAC), and other radiation equipment requiring a vacuum area for beam transport and detection.

Therefore, in light of the above described deficiencies of the state of the art, advanced scintillation plates and methods of manufacturing such scintillator plates is strongly desired, to increase resolution of the detector, facilitate the optical readout, to reduce manufacturing costs, and to provide for a simplified design.

SUMMARY

According to one aspect of the present invention, a scintillation detector or device is provided. Preferably, the scintillation detector or device includes a silicon plate having a rectangular shape and having a first side and a second side opposite the first side, wherein the first side includes a plurality of first channels arranged to be in parallel with each other extending in a first direction, wherein walls in the silicon plate that form the first channels are coated with an optically reflective or dielectric layer, and wherein the first channels are filled with a scintillation resin in a solid state forming a first waveguide.

Moreover, preferably, the second side of the silicon plate includes a plurality of second channels arranged to be in parallel with each other extending in a second direction, the first and second direction being perpendicular to each other, wherein walls in the silicon plate that form the second channels are coated with an optically reflective or dielectric layer, and wherein the second channels are filled with the scintillation resin in a solid state forming a second waveguide.

According to another aspect of the present invention, a method for manufacturing a scintillation detector or device is provided. Preferably, the method includes the steps of forming a plurality of parallelly-arranged first channels into a first side of a silicon plate, coating walls of the silicon plate that form the first channels with a reflective or dielectric layer, filling the plurality of first channels with a viscous and polymerizable scintillation resin, applying a pressure with a silanized surface to the first side of the silicon plate to thereby exert a pressure on the viscous and polymerizable scintillation resin, and polymerizing the scintillation resin inside the plurality of the first channels to form a plurality of first waveguides.

Moreover, preferably, the method further includes the steps of second forming a plurality of parallelly-arranged second channels into a second side of the silicon plate, arranged to be perpendicular to the first channels, second coating walls of the silicon plate that form the second channels with a reflective or dielectric layer, second filling the plurality of second channels with the viscous and polymerizable scintillation resin, second applying a pressure with a silanized surface to the second side of the silicon plate to thereby exert a pressure on the viscous and polymerizable scintillation resin, and second polymerizing the scintillation resin inside the plurality of the second channels to form a plurality of second waveguides.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1C shows a cross-sectional side view with a cut plane along a second channel 30, showing exemplary first channels 20 having a square cross-section and include a reflective or dielectric layer 40 that forms a element between scintillation resin SR of waveguide 25 of first channel 20 and silicon plate 10, and FIG. 1D shows a cross-sectional side view with a cut plane along a first channel 20, showing exemplary second channels 30 having a square cross-section and include a reflective or dielectric layer 50 that forms a element between scintillation resin SR of waveguide 35 of second channel 30 and silicon plate 10;

Herein, identical reference numerals are used, where possible, to designate identical elements that are common to the figures. Also, the images are simplified for illustration purposes and may not be depicted to scale.

DETAILED DESCRIPTION OF THE EMBODIMENTS

Figure 1A:
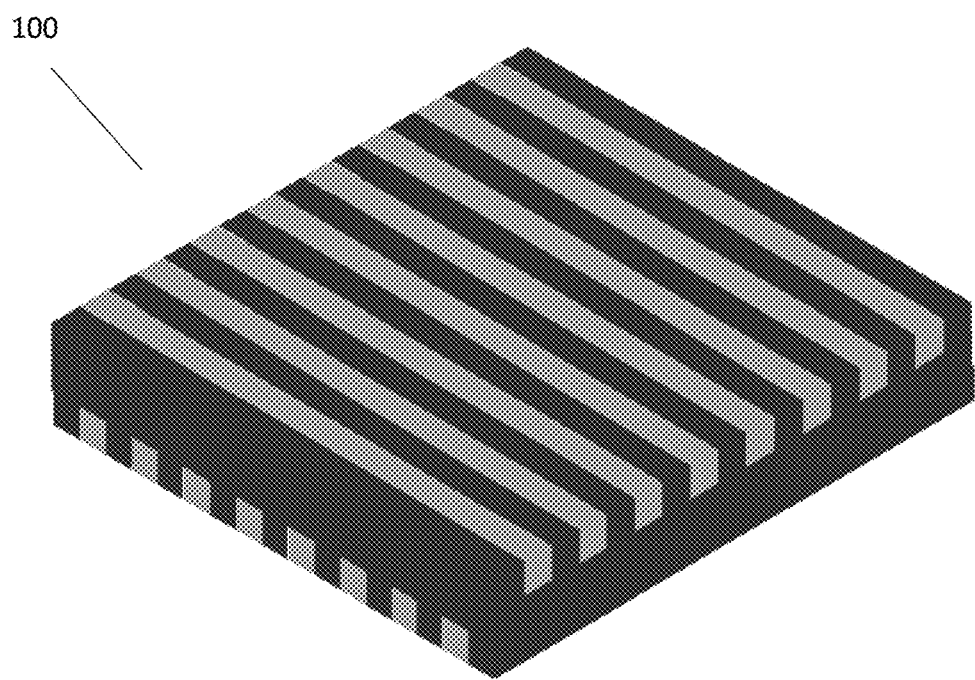
FIGS. 1A to 1D show aspects of the scintillation device or detector 100 according to one aspect of the present invention, with FIG. 1A showing a perspective simplified view of scintillation device or detector 100 with first and second channels 20, 30 having scintillation resin 25, 35, respectively, FIG. 1B showing a perspective simplified view of scintillation detector 100 equipped with two photodetector devices 60, 70 that arranged along sidewalls of scintillation detector 100.

According to one aspect of the present invention, and as illustrated with a non-limiting example in FIGS. 1A to 1D, a scintillation detector or device 100 is provided. The scintillation detector or device 100 can include silicon plate 10 having a rectangular shape and having a first side and a second side opposite the first side, wherein the first side includes a plurality of first channels, trenches, or grooves 20 arranged to be in parallel with each other extending in a first direction, and the second side includes a plurality of second channels, trenches, or grooves 30 arranged to be in parallel with each other extending in a second direction, the first and second direction being perpendicular to each other, and substantially arranged to be in parallel to plane of extension of the silicon plate 10. Moreover, walls that are formed in the silicon plate 10 that define channels 20, 30 are coated or otherwise covered with an optically reflective or dielectric layer 40, 50, and the first and second channels 20, 30 are filled with a scintillation resin SR in a solid state forming a first and second waveguides 25, 35, respectively, the optically reflective or dielectric layer 40, 50 forming a cladding layer for first and second waveguides 25, 35, respectively. The reflective or dielectric layers 40, 50 guarantee the guiding of the light. In this respect, photons are generated into the scintillating resin SR, and they are guided towards the first and second photodetection devices 60, 70 due to the reflection caused by the reflective or dielectric layers 40, 50. In the case where a dielectric layer is used, the difference between the refractive index of the scintillating resin SR and the one of the dielectric layer 40, 50 provides for the reflection and guiding of the photons in the channels 20, 30. In an exemplary embodiment, a 50 nm thick Aluminum (Al) layer has been used for reflective layers 40, 50. Generally, for metallic reflective layers, a thickness of a few nanometers is sufficient for performing the reflection, preferably more than 1 nm. However, for the dielectric layer, a layer thickness in the micrometer range is preferably, preferably more than 1 μm. See for example Pietro Maoddi, "Microfluidic Scintillation Detectors for High Energy Physics," Ph.D. Thesis, École Polytechnique Fédérale de Lausanne (EPFL), Lausanne, Switzerland, Jun. 19, 2015, pp. 23-32. For example, the silicon plate 10 can have a square shape with sides having an equal length, and the silicon plate 10 can be made of p-doped Silicon.

In addition, the first and second channels 20, 30 are filled with a scintillation resin SR that is in a solid state. For example, as a non-limiting embodiment the scintillation resin can include a polyvinyltoluene-based (PVT-based) partially polymerized plastic scintillator. Moreover, in terms of the geometric arrangement of the first and second channels 20, 30, in an example, a first pitch of the plurality of first channels 20 is equal to a second pitch of the plurality of second channels 30, a first width of the plurality of first channels 20 is equal to half the first pitch, and a second width of the plurality of second channels is equal to half the second pitch. The width of the half pitch of channels 20, 30 is only one embodiment, and from a fabrication perspective there is the possibility to have larger or smaller widths depending on the application of detector or device 100. For example, if there is a need to increase detector sensitivity, the width of channels 20, 30, relative to their pitch can be increased, such to generate more photons per channel. Also, preferably, a cross-section of the first and second channels 20, 30 is preferably square-shaped. In this respect, each channel of the plurality of first channels 20 and each channel of the plurality of second channels 30 are not connected to each other, and the waveguides 25, 35 form rectangular bars that have a square-shaped cross-section.

Figure 1B:
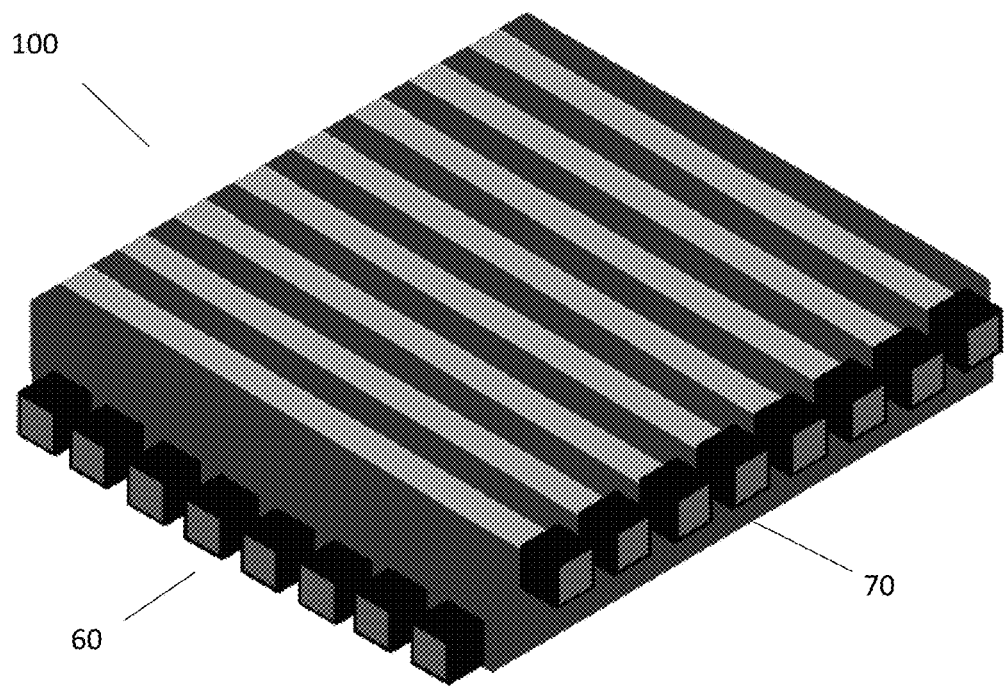
Figure 1C:
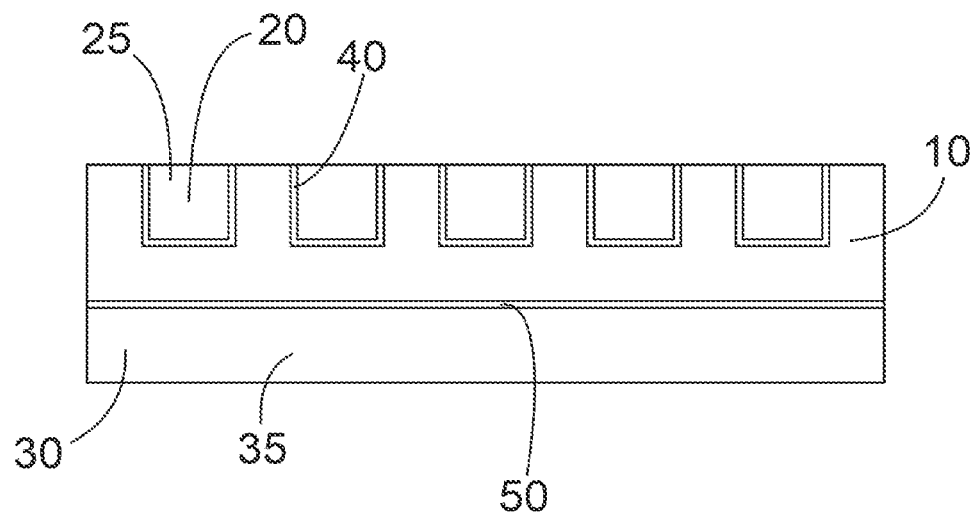
Figure 1D:
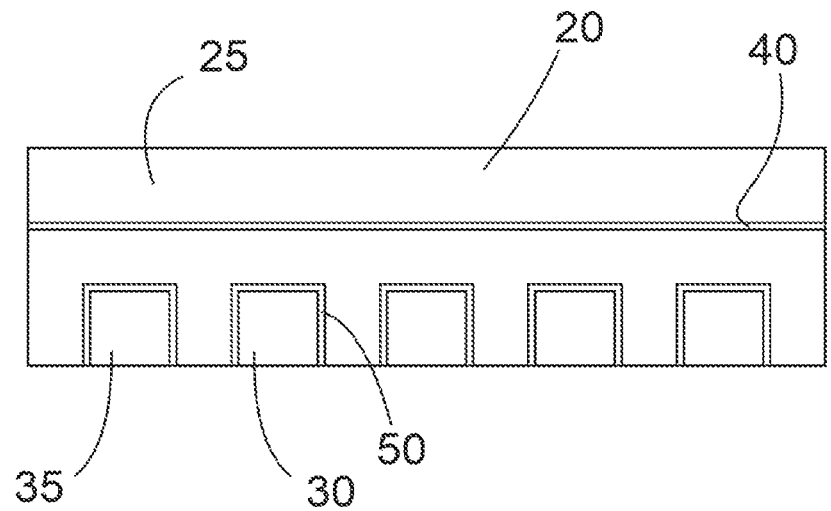
Figure 2:
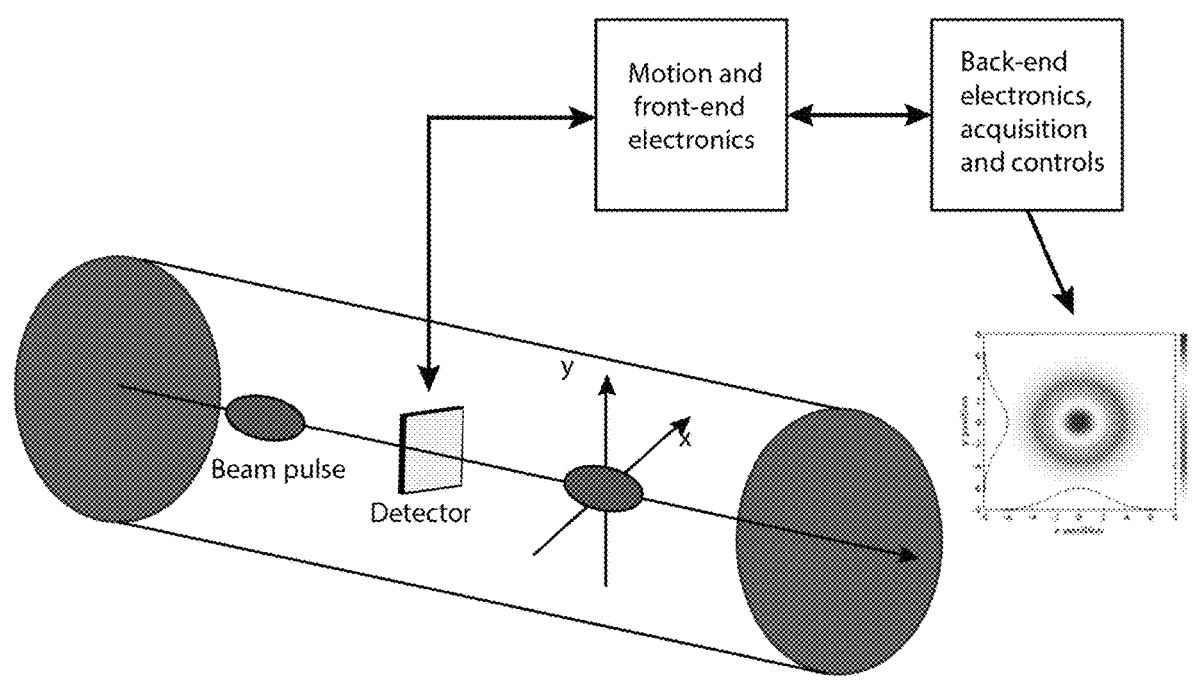
FIG. 2 shows an exemplary representation of a medical imaging radiation system that can operate in a beam profiler operation, according to another aspect of the present invention, showing scintillation detector 100 that can be irradiated by a beam, and including motion and front-end electronics that are operatively interconnected to the first and second photodetector devices 60, 70, and including back-end electronics, acquisition, and control, for generating and displaying radiation images of an irradiated subject.

As illustrated in FIG. 1B, the scintillation device or detector 100 can further include a first photodetector device 60 arranged at a first sidewall of the silicon plate 10, configured to receive first scintillation light from the plurality of first waveguides 25 of the first channels 20, and a second photodetector device 70 arranged at the second side wall of the silicon plate 10, configured to receive second scintillation light from the plurality of waveguides 25 of the second channels 20. For example, the first photodetector device 60 includes a first photodetector array having a plurality of photodetectors, the photodetectors arranged at a third pitch that corresponds to the first pitch of the first channels 20 and first waveguides 25, and the second photodetector device 70 includes a second photodetector array having a plurality of photodetectors, the photodetectors arranged at a fourth pitch that corresponds to the second pitch of second channels 30 and second waveguides 35. As a non-limiting example, the first and second photodetector devices 60, 70 can be commercially available linear photodiode arrays with readout electronics, as a non-limiting example two S13885-128 from Hamamatsu™, having an array of 128 photodiodes, and a pitch that can match with the pitch of channels 20, 30.

With the waveguides 25, 35 and their cladding by layers 40, 50, the guiding of light is guaranteed by the metal or dielectric coating on the silicon channels, for example by the use of aluminum (Al) as an exemplary reflective layer material for the specific wavelength of light generated by scintillation material of SR. For example, particle beam generated by a particle source can interact with the scintillating material of scintillation detector or device 100, during the interactions photons are generated inside the scintillation material and are guided by metal coatings or layers 40, 50 towards the photodetection system. The channels 20, 30 are open on the respective frontal side of plate 10, and the guiding is guaranteed by the total internal reflection (TIR), because the refractive index of the air, which is in contact with the scintillating material of waveguides 25, 35 is lower than the refractive index of the scintillating material.

It is possible to thereby produce scintillator devices 100 with a relatively large number of first and second channels 20, 30, having a width and depth with microscopic dimensions, even nanoscopic dimensions, for example a width and depth in a range between 500 nm to 200 μm. The minimal dimensions are limited only by the microfabrication techniques. Nowadays, sub-micrometer features are achievable with standard micro/nanofabrication processes. With a scintillation device 100, the smaller the channels 20, 30, the higher the resolution of but the fewer scintillating material is in the channels, meaning that the number of outcoming photons due to the scintillation process is lower.

Figure 3:
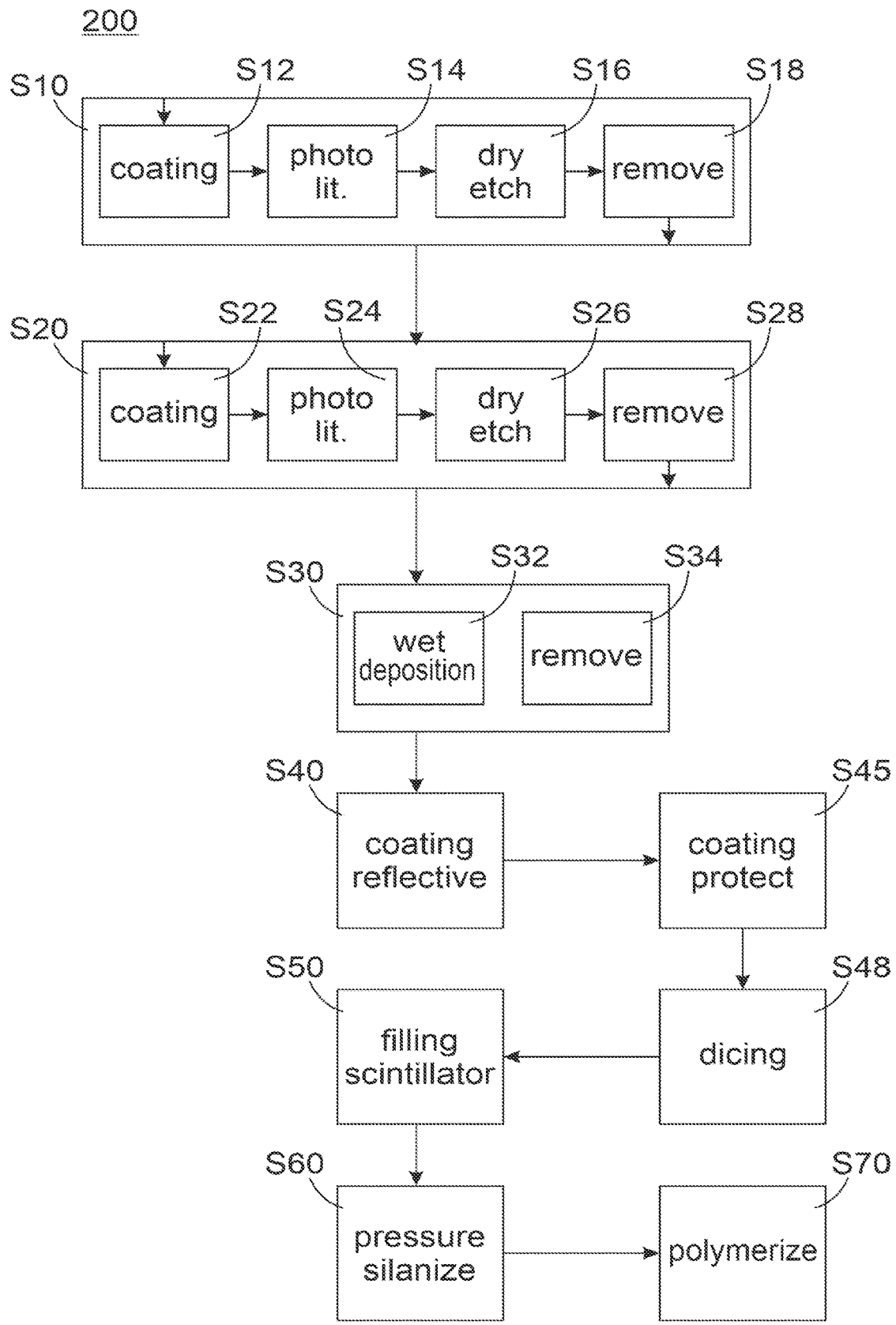
FIG. 3 shows an exemplary flowchart of a method 200 according to yet another aspect of the present invention, showing the different steps of the method, with an exemplary variant.

According to another aspect of the present invention, a method 200 for manufacturing a scintillation detector or device 100 is provided, as schematically and exemplarily shown in FIG. 3. Preferably, a silicon plate 10 is used to form the scintillation detector, for example a p-doped silicon wafer, or an undoped silicon wafer. First, method 200 can include the step S10 of forming a plurality of parallelly-arranged first channels or grooves 20 into a first side of a silicon plate 10, the first channels 20 extending in a first direction that is substantially parallel to a surface formed by the first side of silicon plate 10, a step S20 of forming a plurality of parallelly-arranged second channels or grooves 30 into a second side of a silicon plate 10, the second side being opposite to the first side, the second channels arranged and extending in a second direction that to be perpendicular to the first direction of the first channels, also substantially in parallel to the second side of silicon plate and a step S40 of coating walls of the silicon plate 10 that form the first and second channels 20, 30 with a reflective or dielectric layer 40, 50, to form a first reflective or dielectric layer 40 in contact with walls that form the first channels 20 and to form a second reflective or dielectric layer 50 in contact with walls that form the second channels 40. The step of coating S40 the reflective or dielectric layer 40, 50 can include the deposition of a dielectric coating having a refractive index that would depend on the depending on the refractive index of the scintillating resin SR used, and preferably the dielectric layers 40, 50 have a refractive index that is lower than the one of the polymerized scintillating resin SR that form waveguides 25, 35. Also, in a variant, the step of coating S40 includes a step of depositing a metal layer, for example aluminum as the reflective layer 40, 50.

Moreover, a step S50 is performed of filling the plurality of first and second channels 20, 30 with a viscous and polymerizable scintillation resin SR to form a first and a second waveguides 25, 35, respectively. This step can include two steps for each side of the silicon plate 10, and can include gravity-based filling, filling by spin-coating, centrifuge-based coating. For example, with step S50, the scintillation resin SR in a viscous or liquid form can be spread on top of the channels 20, 30 by the use of a mechanical blade or palette knife, to fill channels 20, 30 with scintillation resin SR and minimize resin on the exposed surfaces of plate 10 between adjacent channels 20, 30. This step can be performed manually or with a spin coater, using a rotational speed that forces the resin SR to enter the channels 30, and provides for a homogeneous filling of the channels 20, 30. In this respect, the plate 10 with the channels 20, 30 serves a as a container for the scintillation resin SR. Scintillation resin SR can include but is not limited to the commercially available EJ-290 plastic scintillator casting resin manufactured by Eljen Technology. The EJ-290 is a polyvinyltoluene-based (PVT-based) partially-polymerized plastic scintillator, that includes a plastic base made of PVT, a primary wavelength shifter (WLS) fluor made of 2,5-Diphenyloxazole and a secondary fluor. For example, the EJ.290 product is made of three different components or parts A, B, C, with a resin A, a monomer B, and a catalyst C, and the monomer part B can be increased until a desired viscosity is reached for the filling of the channels 20, 30. Other scintillation resins can be used, such as but not limited to the product BC-490 Plastic Scintillator Casting Resin from Saint-Gobain. Similarly, in the method for manufacturing a scintillation detector structure, and a polymeric mold for the manufacturing method, as described in U.S. patent application Ser. No. 17/846,136 concurrently filed with the present application, analogous moldable scintillon resin material is used, this reference herewith incorporated by reference in its entirety.

Thereafter, a step S60 is performed, where a pressure is applied with a silanized surface to the first side and the second side of the silicon plate 10, for example by using a press with a stamp having the silanized surface. More specifically, a piece of silanized polydimethylsiloxane (PDMS) plate or block can be pressed onto the first and the second surface of the silicon plate 10 forming a mold for the scintillation resin SR with channels 20, 30, plus a weight on top of silicon plate 10 after the step of filling, where the SR was filled into channels 20, 30. The silanization process for manufacturing the PDMS plate or block can be performed with a perfluoro-terminated silane to increase the hydrophobicity of the surface of the PDMS plate or block creating a fluorinated monolayer. The presence of the highest electronegative atoms does not create bonds between the scintillation resin SR and the surface of PDMS plate or block. Other polymeric materials can be used instead of PDMS, for example polymeric materials that have similar properties as PDMS, in terms of elasticity, temperature resistance, for example a similar glass transition temperature, and similar hydrophobic surface properties. For example, other materials that can be used for the press or stamp can be but is not limited to Polystyrene, Polycarbonate, or Flexdym™ polymer from the company Eden Tech, or a combination of these materials.

For example, to manufacture the stamp, step S60 can include a silanization process where a silane is evaporated onto a PDMS block or plate, for example by using Perfluoroctyltriethoxysilane (PFOTS) as an exemplary silane. Before the silanization, a pre-processing step can be performed, where the surface of the PDMS block or plate can be activated with oxygen plasma, for example during 45 seconds with a power of 20 W. To perform the silanization process, about 100 µL to 500 µL of silane can be placed in a container such as a vial, and the vial and the PDMS block or plate are placed in a vacuum chamber at a pressure of about 65,000 to 70,000 pascal, for at least two (2) hours or more, such that the silane evaporates and creates a monolayer of fluorine-terminated silanes on a surface of the PDMS block or plate, and this monolayer prevents the resin SR from adhering to the PDMS material that serves as the stamp during the application of the pressure by step S60.

Next, a step S70 can be performed where the scintillation resin SR that is located inside the channels 20, 30 is polymerizing inside the plurality of the first and second channels 20, 30. Step S70 can includes a heat treatment, for example a heat treatment for about 4 hours at about. 80° C., to polymerize and solidify the SR. For example, the heat treatment can be performed in a heating oven or furnace, under a fume hood. Also, to remove any resin residual on the surface, a mechanical polishing can be performed. As an alternative, Polyvinyltoluene particles can be etched with O2 or CF4/O2 plasma (Ref: C. J. Zimmermann et al., J. Mater. Res., Vol. 6, No. 4, April 1991).

Moreover, the steps S10 and S20 of first and second forming the plurality of parallelly-arranged first and second channels or grooves 20, 30 can include several substeps, for example to process each side of silicon plate 10 separately, for example a step S12, S22 of coating the first or second side of the silicon plate 10 with a photoresist, a step S14, S24, performing photolithography and development to pattern the parallelly-arranged first or second channels 20, 30 into the silicon plate 10, a step S16, S26 of dry-etching the parallelly-arranged first or second channels 20, 30 with an inductively coupled reactive ion etching, and a step S18, S28 of removing the photoresist. The step of removing photoresist can be performed after both steps S16, S26 have been performed, for example with a bath and a solvent to place silicon plate 10 therein, or by using the Oxygen plasma.

Moreover, with the step S14 of forming the channels 20 by patterning, or with a separate step, it is also possible to form a few markers into the first surface of the silicon plate that can be used as a reference for orientating the channels 30 with the step S24 of forming channels 30. To align the two sets of channels 20, 30 such that they are arranged perpendicular to each other between the front side and the back side, is to pattern markers on the first patterned surface, for example on the front side of the plate 10. Using the markers as reference, it is possible to align the pattern on the second surface, e. g. the back side of the plate 20, with a sub-micrometer accuracy.

Moreover, after steps S10 and S20 where the channels 20, 30 are formed, method 200 can include a step S30 of chemical polishing of the silicon plate 10, preferably before the step S50 of filling the first and second channels 20, 30 with the scintillation resin SR, and preferably before the step S40 of providing the reflective or dielectric coating layers 40, 50. Preferably, plate 10 should have channels 20, 30 with substantially flat and vertically-arranged side walls before the filling of the SR to reduce photon losses. Preferably, the surface roughness Rq of the side walls of the silicon plate 10 that form channels 20, 30 should be of optical quality, more preferably lower than half of the wavelength of the photons that will be emitted during the scintillation process. For example, in the case of the resin EJ-290 as the scintillation resin SR, the emission spectrum has a maximum wavelength at 425 nm, meaning that ideally the surface roughness Rq of the sidewalls that form channels 20, 30 should be smaller than 425 nm/2=212.5 nm. When a deep reactive ion etching is performed to etch channels in the silicon wafer or plate 10, for example with the steps S10, S20, imperfections on the sidewalls appear due to the so called "scalloping effect." The chemical polishing step S30 is therefore performed to even out the surfaces of the walls of channels 20, 30, for example to remove artifacts and surface aberrations that are a consequence of the dry-etching of steps S16, S26.

For example, chemical polishing step S30 can include a silicon cleaning step, for example an RCA cleaning to reduce these imperfections, performed after the etching. Next, the chemical polishing step S30 can further include a step S32 of wet depositing a layer of silicon dioxide ($SiO_2$) on the first and second side of the silicon plate 10, for example a layer having a thickness between 1 µm and 5 µm, preferably about 2 µm, and a step of removing the layer of $SiO_2$ with a buffered oxide etch (BOE, BHF) from both the first and second side of silicon plate 10. Thereby, the walls of channels 20, 30 are much more even and form flatter surfaces. This step is preferable as different structuration defects on the wall surfaces of silicon plate 10 that form channels 20, 30 can hinder the transmission of the photons towards the photodetectors 60, 70, as it increases the losses of the photons. For example, with the chemical polishing step S30, it is possible to eliminate the scalloping effect caused to the channels after the etching with steps S16, S26, and it is thereby possible to have flat surface walls of the channels 20, 30, with a surface roughness of less than 100 nm. This step provides for surfaces of channels 20, 30 that can guarantee a more efficient transportation of the photons, coming from the scintillation process, to the photodetectors.

In a variant, it is also possible that a mechanical polishing step is performed, for example in addition to the chemical polishing step. Moreover, it is also possible that method 200 includes a step of providing a protective coating S45 and a step of dicing or cutting the silicon plate 10, to form a rectangularly or square-shaped plate 10. For example, the step S45 can include the deposition of a photoresist or other protective film for surface protection, after the step of coating the walls with the reflective material with a step S40.

In sum, with at least some of the aspects of the present invention, a frame-rate and high-resolution scintillation detector 100 for two-dimensional (2D) reconstruction of the beam profile is provided, and a method 200 of manufacturing the same. The detector 100 aims at the application of beam diagnostics, which is crucial to regularly verify beam parameters, especially in hadron-therapy facilities. Scintillation detectors 100 are designed to suit all types of proton or heavy ion medical accelerators, namely cyclotrons, synchrotrons, and linacs, but they could also be used for dosimetry or X-ray and electron imaging.

According one aspects of the present invention, a method is provided that fabricates microchannels 20, 30 on both sides of a silicon plate 10, for example a silicon wafer and fill the channel 20, 30 with a scintillating resin SR. The channels 20, 30 on different sides of silicon plate 10 are preferably orthogonal to each other. Integrating the end of each channel with a readout system, for example photodetector devices 60, 70 as arrays makes the two-dimensional reconstruction of the beam profile possible. The reconstruction of the beam profile is described in U.S. Pat. No. 9,316,748, this reference herewith incorporated by reference in its entirety. Also, additional aspects between of the coupling between the photodetectors and the waveguides are described in U.S. Pat. No. 6,892,010, this reference herewith incorporated by reference in its entirety. Furthermore, the use of a CMOS or CCD image sensor instead of a photodetector array is described in U.S. Pat. No. 8,026,489, this reference herewith incorporated by reference in its entirety. See also Alessandro Mapelli, "Scintillation Particle Detectors Based on Plastic Optical Fibres and Microfluidics," Ph.D. Thesis, École Polytechnique Fédérate de Lausanne (EPFL), Lausanne, Switzerland, Sep. 2, 2011, p. 98.

In such systems, once the particle beam (e.g., protons, ions, etc.) hits the scintillating material, light is generated due to the scintillation process. To guarantee that the photons are guided to photodetector devices 60, 70, channels 20, 30 are metal-coated or coated with a dielectric material, thus they act as a waveguide thanks to the multiple reflection phenomenon.

With method 200, channels 20, 30 with microscopic or even nanoscopic dimensions are made with microfabrication techniques, which allow patterning any design with a resolution below 1 µm. A scintillating resin SR can then poured or otherwise provided into the channels 20, 30. Resin SR is quite viscous before the polymerization and becomes solid right after. This is what makes it appealing more than scintillating liquid, where difficulties to fill the channels have to be overcome due to their capillarity.

The advantages of device or detector 100 and the method of fabricating the same is the possibility to provide for a high spatial resolution, which is given by the width of the channels and their pitch, the high-frame rate, the possibility to easily change the design of the pattern since the fabrication process is quick and straightforward, and their low cost. In fact, the biggest problems of the scintillating fiber-based detectors currently used for beam diagnostics and experiments, are their spatial resolution, limited by the dimensions of the fibers at about 250 µm, their extremely high cost per detector, and their short life due to radiation damage. Also, due to the solidification of the scintillation resin, it also possible to use the scintillation detectors or devices 100 in a vacuumized environment, for example within the vacuum system of a particle accelerator device or other type of radiation imaging device requiring a vacuumized environment.

With the herein presented device 100 and method 200, the disadvantages associated with the existing devices is addressed. In particular, device 100 allows the reconstruction of the beam in two dimensions with a resolution which is higher than the one provided by the existing devices. It is very easy to fabricate and quite cheap because the major costs are due to the scintillating resin and the electronics. The active area can be as large as the dimension of a microelectronics wafer and, in principle, its resolution is limited only by the microfabrication techniques, which is below one micrometer. However, it is also possible to arrange a plurality of devices 100 as tiles of an array, to cover larger detecting areas. A way to further enhance the resolution is to increase the number of layers, for example by the use of two stacked device 100, in such a way that the layers with the channels in the same direction are staggered, meaning that channels 20 of one side of one scintillator device 100 are offset relative to the channels 20 of the same side of another scintillator device 100, and the same is the case for channels 30 of two different scintillator devices 100. This could provide for a scintillation device with an even higher resolution, based on the herein presented scintillator device 100.

Another advantageous aspect of the device is the thickness, because depending on the quantity of the scintillating necessary for the application, it can be a very thin detector, avoiding significant beam perturbation. For example, scintillator device 100 having a thickness in an exemplary range between 50 µm and 500 µm can be produced. Moreover, being very quick to fabricate and at low cost, it is possible to produce a large number of devices 100, meaning that upon damaging them by the radiation, they can be easily replaced. Since the electronics is 'plug and play', in other words can easily be removed and replaced, one can replaced just the active area, that is the part affected by the radiation damage. Last, the fabrication yield of the proposed fabrication processed is very high as it can be standardized without critical passages.

Figure 4A:
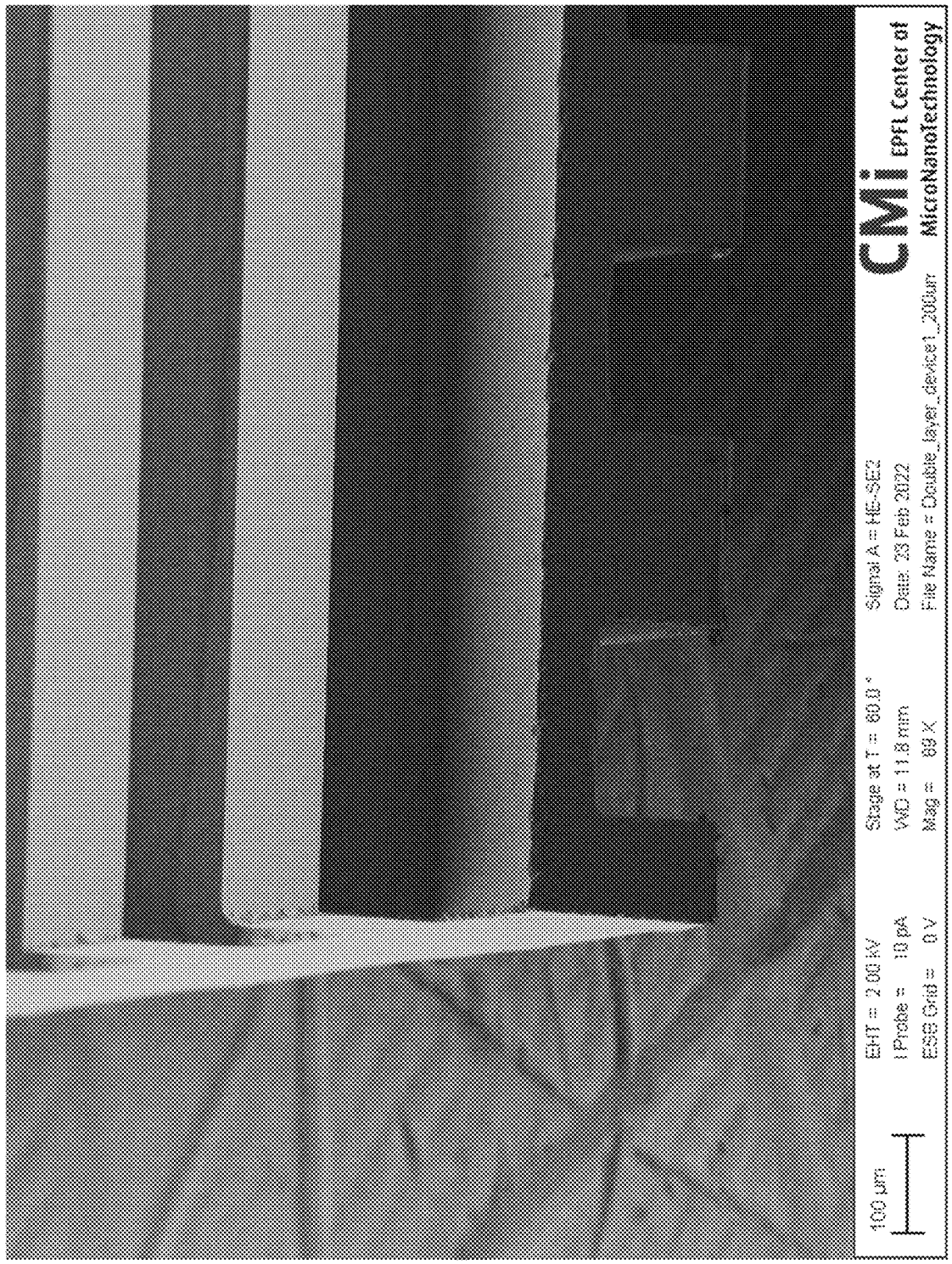
FIGS. 4A and 4B show top side views of a scanning electron microscope (SEM) images of a corner of an exemplary silicon plate 10 with first and second channels or grooves 30, manufactured by the herein presented method, having a channel width of 200 μm and a channel pitch of 400 μm shown with different resolutions.
Figure 4B:
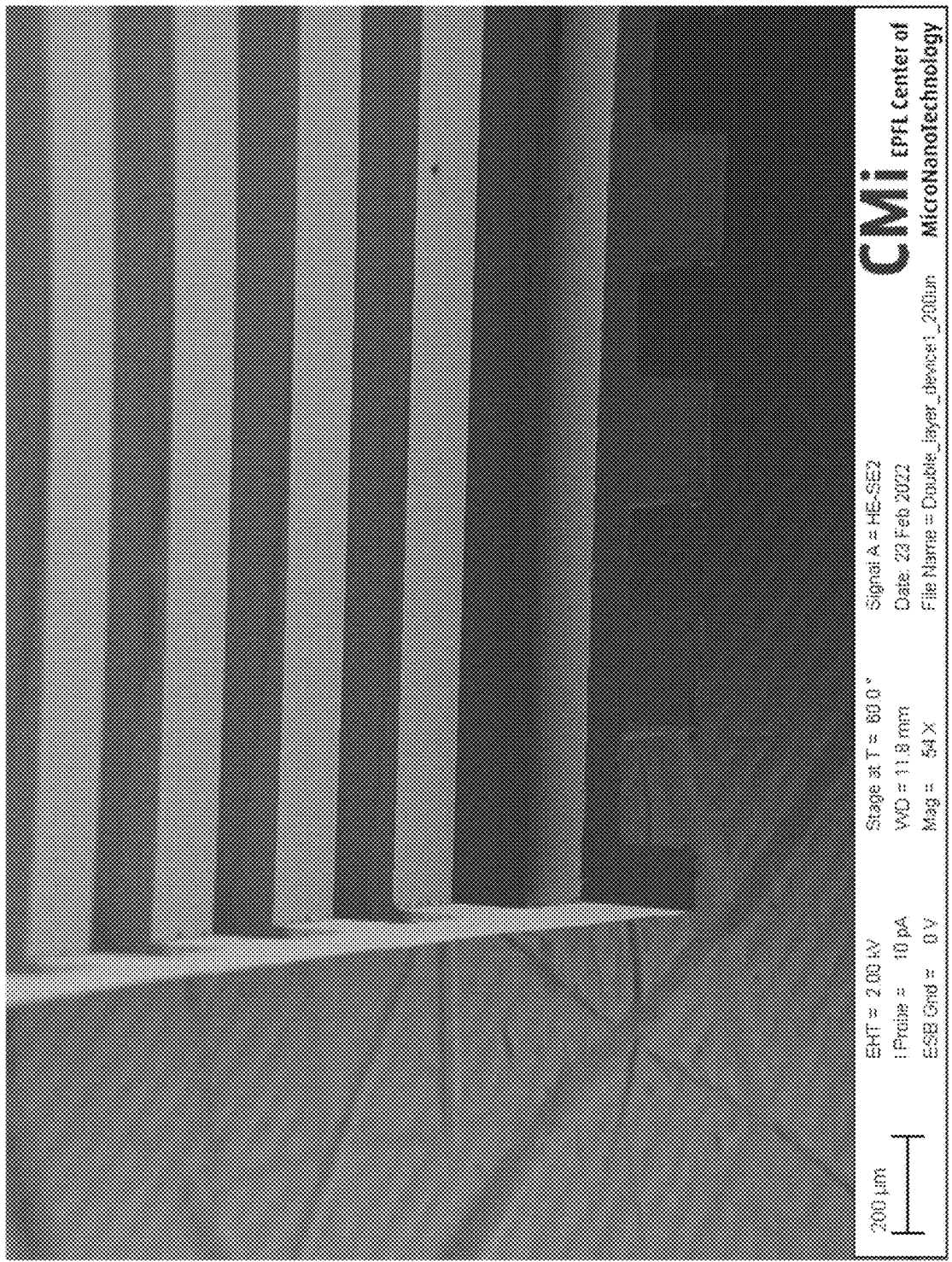
Figure 5A:
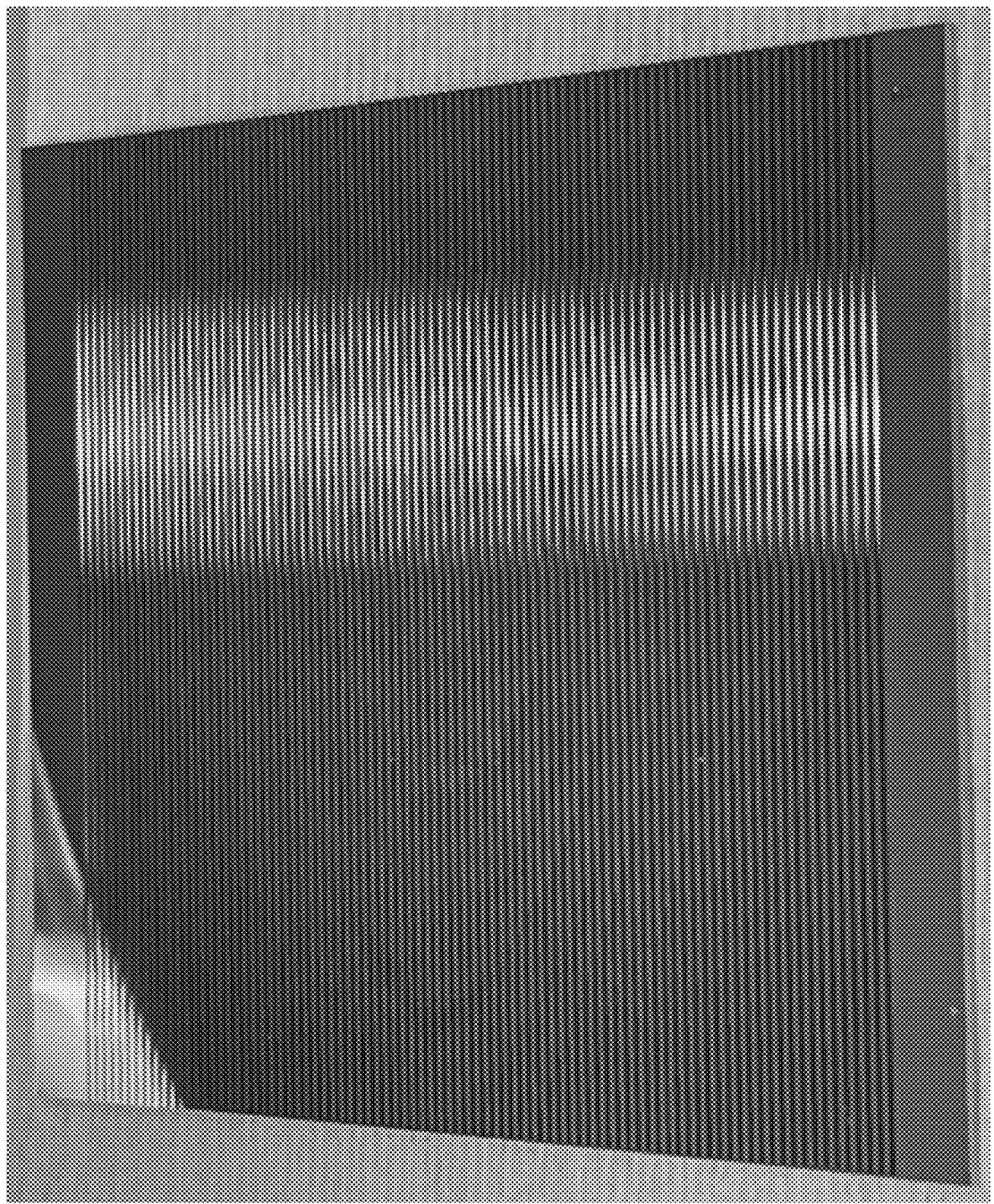
FIGS. 5A and 5B show photos of one side of silicon plate 10, coated with a metal layer, for example a 50 nm thick Aluminum (Al) layer, with FIG. 5A showing a plate 10 having a channel width of 200 μm with a channel pitch of 400 μm, and with FIG. 5B showing a plate 10 with a channel width is 100 μm and a channel pitch 200 μm, the channels covering a surface area of 35 mm to 35 mm.
Figure 5B:
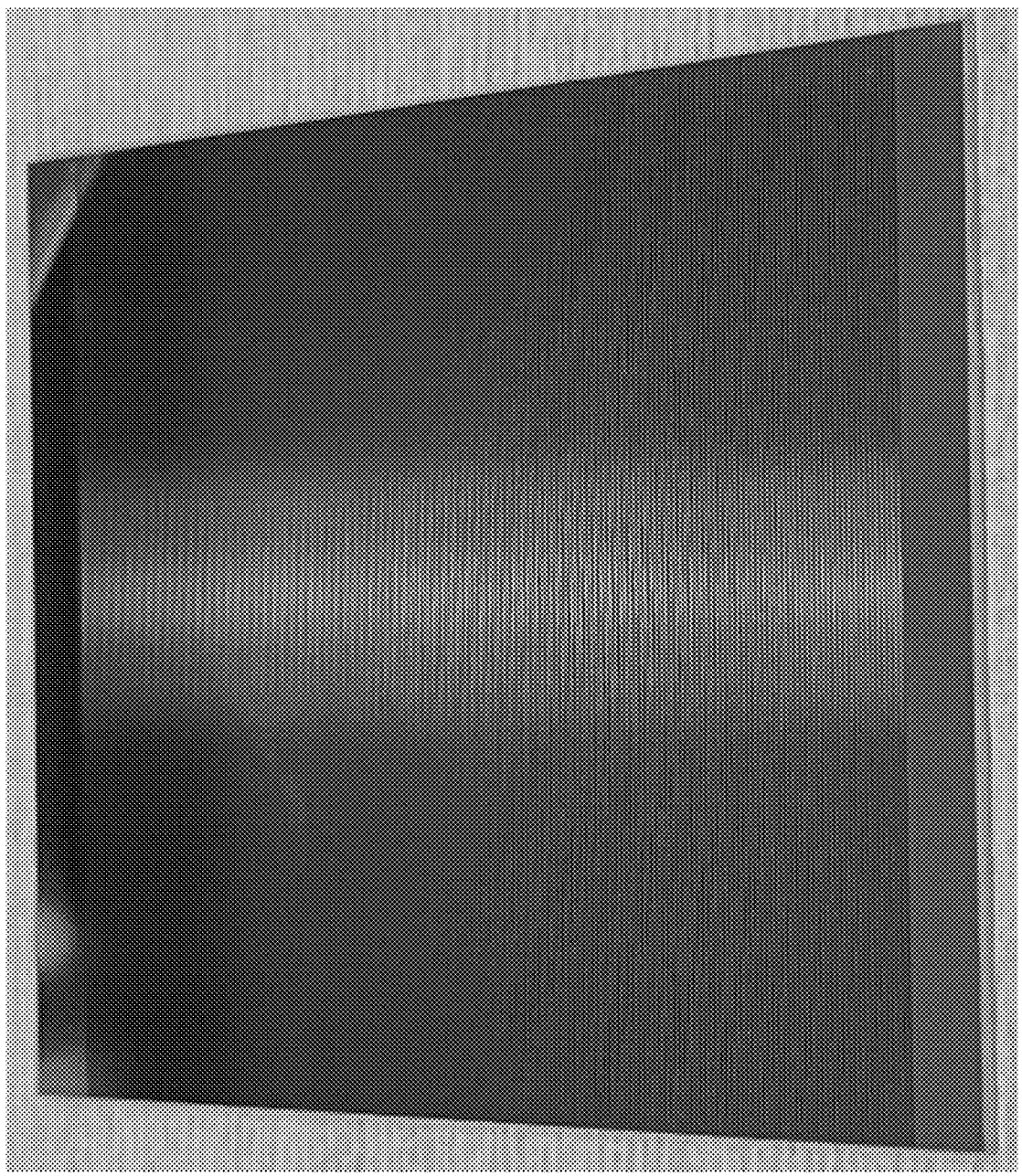

FIGS. 4A and 4B show a SEM image of a corner the plate 10 where channels 20, 30 of an exemplary 200 µm width and a pitch of 400 µm have been etched with steps S16, S26, and FIGS. 5A and 5B show images of two silicon plates 10 serving as molds after the metal deposition with a step S40 and the resin filling and polymerization with steps S50, S70. The length of the channels 20, 30 in both the active areas is about 3.5 cm, but there are no restrictions to make them longer and, thus, realize a bigger active area.

Figure 6A:
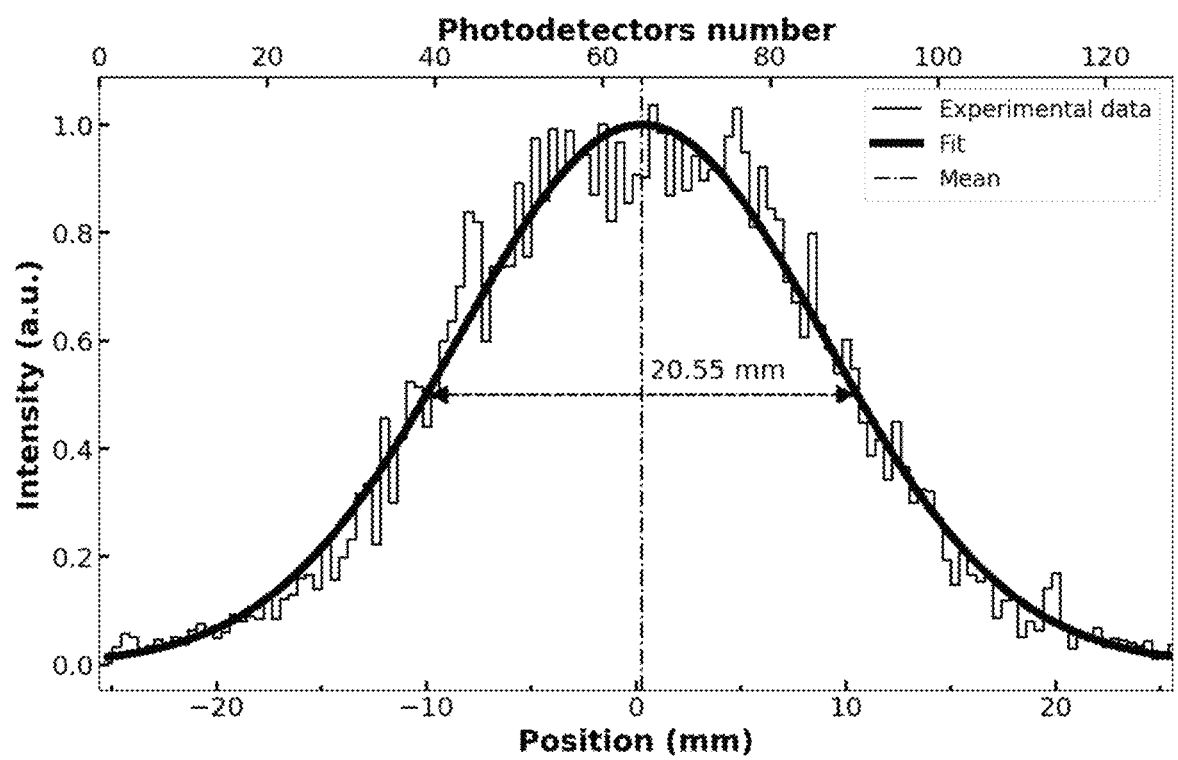
FIGS. 6A to 6C show different experimental results with scintillation detectors 100 as manufactured by the herein described method, showing profiles of proton beams that have been received by an exemplary photodetector device 60, 70, for example with 128 exemplary photodetector diodes, showing the reproduction of the Gaussian distribution of the original proton beam, at different energies, with FIG. 6A showing a graph with the read signal intensity as a function of a number of a photodetector from the array of photodetector device 60, 70 that is capturing the light emitted from the channels 20, 30 with a beam energy of 150 MeV, FIG. 6B showing a graph for the beam energy of 178 MeV, and FIG. 6C showing a graph for the beam energy of 220 MeV.
Figure 6B:
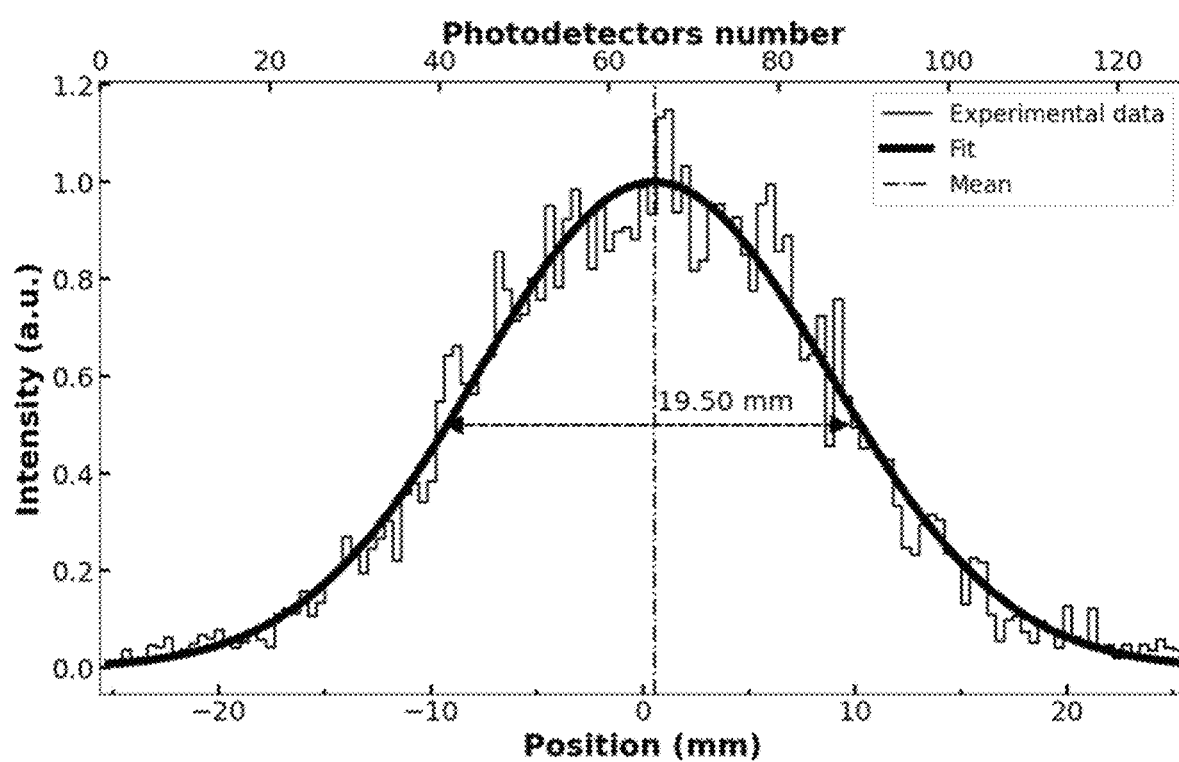
Figure 6C:
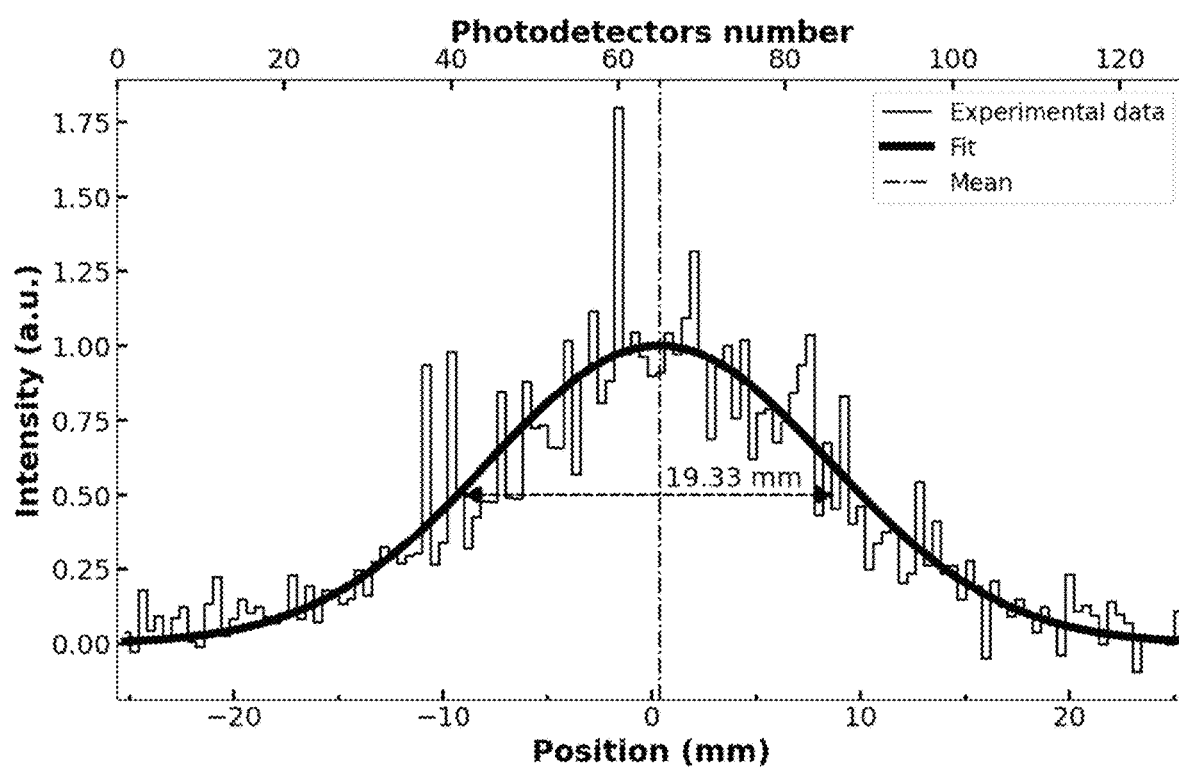

Different experimental results have been performed with an exemplary scintillation detector 100, for example as manufactured by the herein described method 200, and FIGS. 6A to 6C show different graphs illustrating proton beams that have been received by a photodetector device 60, 70 having an exemplary number 128 exemplary photodetector diodes that match with an exemplary number 128 of channels 20, 30, forming waveguides, the plate 10 forming detector 100 having the exemplary dimensions of 35 mm to 35 mm, with a channel or waveguide pitch of 400 µm and a width of 200 µm, showing the reproduction of the Gaussian distribution of the original proton beam at different energies, with FIG. 6A showing a graph with the read signal intensity as a function of a number of a photodetector from the array of photodetector device 60, 70 that is capturing the light emitted from the channels 20, 30 with a beam energy of 150 MeV, FIG. 6B showing a graph for the beam energy of 178 MeV, and FIG. 6C showing a graph for the beam energy of 220 MeV. With a filter or fitting algorithm, the original Gaussian distribution of the proton beam can be reconstrued with great accuracy. The intensity values at the abscissa have been normalized between zero (0) and one (1) after the fitting of the experimental data measured or captured from the photodetectors.

With respect to the different application fields for device 100, it would be possible to provide for scintillating detectors suitable for all types of proton or heavy ion medical accelerators, e.g., cyclotrons, synchrotrons, and linacs. Scintillation detector 100 could be extremely useful in hadron therapy facilities for beam diagnostics. Hadron therapy, and in particular proton therapy, is being used more frequently, for the unique physical properties of the charged particles to penetrate tissues with a little diffusion and deposit the energy over a narrow range of depth, which allows targeting the tumor avoiding damaging the healthy nearby tissues. The maximum energy is released at the so-called Bragg peak, just before stopping. Currently, about 121 particle therapy facilities are in operation worldwide, 38 are under construction, and 28 in planning stage. Also about, 55000 patients have been treated with proton therapy and 4000 with carbon ions. Another possible application can be dosimetry, it could substitute the dose delivery system in accelerators for particle therapy, effectively becoming a medical device. X-ray imaging is potentially another commercial application of the proposed detector 100.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A scintillation device comprising:
a silicon plate having a first side and a second side opposite the first side, wherein the first side includes a plurality of first channels arranged to be in parallel with each other extending in a first direction,
wherein walls in the silicon plate that form the first channels are coated with an optically reflective or dielectric layer,
wherein the first channels are filled with a scintillation resin in a solid state forming a first waveguide,
wherein the second side of the silicon plate includes a plurality of second channels arranged to be in parallel with each other extending in a second direction, the first and second direction being perpendicular to each other,
wherein walls in the silicon plate that form the second channels are coated with an optically reflective or dielectric layer, and
wherein the second channels are filled with the scintillation resin in a solid state forming a second waveguide.

2. The scintillation device according to claim 1, wherein the walls of the silicon plate that form the first channels have a surface roughness that is lower than half of a wavelength of photons that will be emitted by the scintillation resin.

3. The scintillation device according to claim 1, wherein the silicon plate includes a wafer of p-doped or undoped Silicon.

4. The scintillation device according to claim 1, wherein the scintillation resin includes a Polyvinyltoluene-based partially-polymerized plastic scintillator.

5. The scintillation device according to claim 1, wherein a first pitch of the plurality of first channels is equal to a second pitch of the plurality of second channels,
a first width of the plurality of first channels is equal to half the first pitch, and
a second width of the plurality of second channels is equal to half the second pitch.

6. The scintillation device according to claim 1, further comprising:
a first photodetector device arranged at a first sidewall of the silicon plate, configured to receive first scintillation light from the plurality of first channels, and a second photodetector device arranged at the second side wall of the silicon plate, configured to receive second scintillation light from the plurality of second channels.

7. The scintillation device according to claim 1, wherein each channel of the plurality of first channels and each channel of the plurality of second channels are not connected to each other, and form rectangular bars that have a square-shaped cross-section.

8. The scintillation device according to claim 6, wherein the first photodetector device includes a first photodetector array having a plurality of photodetectors, the photodetectors arranged at a third pitch that corresponds to the first pitch of the first channels, and
wherein the second photodetector device includes a second photodetector array having a plurality of photodetectors, the photodetectors arranged at a fourth pitch that corresponds to the second pitch of the second channels.

9. A method for manufacturing a scintillation device comprising the steps of:
forming a plurality of parallelly-arranged first channels into a first side of a silicon plate;
coating walls of the silicon plate that form the first channels with a reflective or dielectric layer;
filling the plurality of first channels with a viscous and polymerizable scintillation resin;
applying a pressure with a silanized surface to the first side of the silicon plate to thereby exert a pressure on the viscous and polymerizable scintillation resin; and
polymerizing the scintillation resin inside the plurality of the first channels to form a plurality of first waveguides.

10. The method for manufacturing the scintillation device of claim 9, further comprising the steps of:
second forming a plurality of parallelly-arranged second channels into a second
side of the silicon plate, arranged to be perpendicular to the first channels;
second coating walls of the silicon plate that form the second channels with a reflective or dielectric layer;
second filling the plurality of second channels with the viscous and polymerizable scintillation resin;
second applying a pressure with a silanized surface to the second side of the
silicon plate to thereby exert a pressure on the viscous and polymerizable scintillation resin; and
second polymerizing the scintillation resin inside the plurality of the second channels to form a plurality of second waveguides.

11. The method for manufacturing the scintillation device of claim 9, wherein the step of forming includes:
coating the first side of the silicon plate with a photoresist;
performing photolithography and development to pattern the parallelly-arranged first channels into the silicon late;
dry-etching the parallelly-arranged first channels with an inductively coupled reactive ion etching; and
removing the photoresist.

12. The method for manufacturing the scintillation device of claim 11, further comprising a step of:
forming first markers into the first surface of the silicon plate by the step of performing photolithography and development.

13. The method for manufacturing the scintillation device of claim 10, wherein the step of second forming includes:
    coating the second side of the silicon plate with a photoresist;
    performing photolithography and development to pattern the parallelly-arranged second channels into the silicon late;
    dry-etching the parallelly-arranged second channels with an inductively coupled reactive ion etching; and
    removing the photoresist.

14. The method for manufacturing the scintillation device of claim 9, further comprising a chemical polishing step of the silicon plate before the step of coating.

15. The method for manufacturing the scintillation device of claim 14, wherein the chemical polishing step includes:
    wet depositing a layer of silicon dioxide (SiO2) on the first side of the silicon plate; and
    removing the layer of SiO2 with a buffered oxide etch (BOE, BHF) from the first side.

16. The method for manufacturing the scintillation device of claim 9, wherein the step of coating walls includes a step of depositing aluminum as the reflective or dielectric layer.

17. The method for manufacturing the scintillation device of claim 10, further comprising the steps of:
    coating the first and second side of the silicon plate with a photoresist for surface protection, after the step of coating the walls; and
    dicing the silicon plate into a rectangular shape, before the step of filling.

18. The method for manufacturing the scintillation device of claim 9, wherein the reflective or dielectric layer includes a dielectric coating having a refractive index that is lower than a refractive index one of the scintillating resin.

19. The method for manufacturing the scintillation device of claim 14, wherein after the chemical polishing step is configured such that the walls of the silicon plate that form the first channels have a surface roughness that is lower than hall of a wavelength of photons that will be emitted by the scintillation resin.

* * * * *